United States Patent
Passath et al.

(10) Patent No.: US 11,084,485 B2
(45) Date of Patent: Aug. 10, 2021

(54) METHOD FOR OPERATING A HYBRID VEHICLE

(71) Applicant: MAGNA STEYR Fahrzeugtechnik AG & Co KG, Graz (AT)

(72) Inventors: Markus Passath, Gleisdorf (AT); Christian Pongratz, St. Peter am Ottersbach (AT); Manfred Posch, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 128 days.

(21) Appl. No.: 16/139,170

(22) Filed: Sep. 24, 2018

(65) Prior Publication Data
US 2019/0023262 A1    Jan. 24, 2019

Related U.S. Application Data

(63) Continuation-in-part of application No. 13/937,250, filed on Jul. 9, 2013, now abandoned.

(30) Foreign Application Priority Data

Jul. 24, 2012   (EP) .................................. 12177683

(51) Int. Cl.
*B60W 20/40* (2016.01)
*B60W 10/06* (2006.01)
(Continued)

(52) U.S. Cl.
CPC ............ *B60W 20/40* (2013.01); *B60W 10/06* (2013.01); *B60W 10/08* (2013.01); *B60W 10/26* (2013.01);
(Continued)

(58) Field of Classification Search
CPC ...... B60W 20/40; B60W 20/13; B60W 10/06; B60W 10/26; B60W 10/08
See application file for complete search history.

(56) References Cited

U.S. PATENT DOCUMENTS 5,820,172 A   10/1998  Brigham et al.
5,831,411 A   11/1998  Klauer et al.
(Continued)

FOREIGN PATENT DOCUMENTS

CN   101380950 A   3/2009
CN   101386301 A   3/2009
(Continued)

OTHER PUBLICATIONS

Office Action and Search Report for Chinese Patent Application No. 20130388239.6, dated Aug. 5, 2015, 6 pages, including 3 pages of English translation.

*Primary Examiner* — Behrang Badii
*Assistant Examiner* — Daniel L Greene
(74) *Attorney, Agent, or Firm* — Jordan IP Law, LLC; Todd A. Vaughn

(57) ABSTRACT

A hybrid vehicle and method for operating such a hybrid vehicle. The hybrid vehicle includes an internal combustion engine, an electric machine, an electric storage device, and a control system. The method includes determining a power currently available of the electric storage device by the control system when a current state of charge of the electric storage device is less than a charge threshold value; activating the internal combustion engine when the determined power currently available from the electric storage device exceeds a first power threshold; and determining the power currently available from the electric storage device by the
(Continued)

control system when the determined power currently available from the electric storage device is less than the first power threshold.

19 Claims, 3 Drawing Sheets

(51) Int. Cl.
*B60W 10/08* (2006.01)
*B60W 20/13* (2016.01)
*B60W 10/26* (2006.01)

(52) U.S. Cl.
CPC ....... *B60W 20/13* (2016.01); *B60W 2510/244* (2013.01); *B60W 2710/0661* (2013.01); *B60W 2710/0677* (2013.01)

(56) References Cited

U.S. PATENT DOCUMENTS

| | | | | |
|---|---|---|---|---|
| 2001/0041952 | A1* | 11/2001 | Nada | B60L 50/16 701/22 |
| 2003/0006076 | A1 | 1/2003 | Tamor | |
| 2003/0037599 | A1* | 2/2003 | Penschuck | F02M 25/0809 73/49.2 |
| 2003/0140905 | A1 | 7/2003 | Nau et al. | |
| 2004/0149246 | A1* | 8/2004 | Itoh | B60K 6/547 123/179.4 |
| 2005/0211479 | A1 | 9/2005 | Tamor | |
| 2006/0021809 | A1 | 2/2006 | Xu et al. | |
| 2006/0036357 | A1* | 2/2006 | Isono | B60K 6/48 701/22 |
| 2007/0124037 | A1 | 5/2007 | Moran | |
| 2007/0205029 | A1* | 9/2007 | Leone | B60K 6/365 180/65.225 |
| 2008/0215201 | A1 | 9/2008 | Okubo et al. | |
| 2009/0045815 | A1* | 2/2009 | Zhang | B60L 58/16 324/426 |
| 2010/0071975 | A1 | 3/2010 | Aoki | |
| 2010/0175936 | A1* | 7/2010 | Schneider | B60W 10/06 180/65.28 |
| 2010/0179704 | A1* | 7/2010 | Ozog | G06Q 50/06 700/291 |
| 2011/0172901 | A1 | 7/2011 | Okumoto et al. | |
| 2011/0204845 | A1* | 8/2011 | Paparo | B60L 53/38 29/602.1 |
| 2011/0256981 | A1 | 10/2011 | Saito et al. | |
| 2012/0130579 | A1 | 5/2012 | Steuernagel et al. | |
| 2013/0030634 | A1 | 1/2013 | Endo et al. | |
| 2014/0274225 | A1* | 9/2014 | Lacatus | H04W 4/029 455/574 |

FOREIGN PATENT DOCUMENTS

| | | |
|---|---|---|
| CN | 101519074 A | 9/2009 |
| DE | 102009027001 A1 | 12/2010 |
| DE | 102010025335 A1 | 2/2011 |
| JP | 2010149701 A | 7/2010 |
| WO | 2011125184 A1 | 10/2011 |

* cited by examiner

METHOD FOR OPERATING A HYBRID VEHICLE

CROSS-REFERENCE TO RELATED APPLICATIONS

The present application is a continuation-in-part of U.S. patent application Ser. No. 13/937,250 (filed on Jul. 9, 2013), which claims priority under 35 U.S.C. § 119 to European Patent Application No. EP 12177683.5 (filed on Jul. 24, 2012), which is hereby incorporated by reference in its entirety.

TECHNICAL FIELD

A hybrid vehicle having an internal combustion engine, an electric machine, an electric storage device and a control system, and a method for operating a hybrid vehicle.

BACKGROUND

A hybrid vehicle having an internal combustion engine and at least one electric machine is known. The electric machine can thereby be configured as the primary drive machine and the internal combustion engine can be, for example, activated as required in order to charge up the electric storage device and/or to directly provide additional drive energy.

For such a hybrid vehicle, an operating method is also known that calculates an optimal activation/starting point in time for the internal combustion engine and are thereby intended in particular to enable travel for as long as possible with purely electric drive. For this purpose, data from navigation equipment are also often evaluated in order to take into account the expected route.

A method is known from DE 10 2010 025 335 A1 for controlling a hybrid motor vehicle having an electric motor drive unit powered from an electric accumulator and an internal combustion engine effectively connected to a generator for charging the accumulator and a control unit for controlling the drive unit. The internal combustion engine is controlled at least depending on one of the following parameters: (i) a demanded continuous power of the accumulator, (ii) a temperature of the accumulator, (iii) vibrations occurring in the motor vehicle, and (iv) a downtime of the internal combustion engine.

The known operating method is undesirable due to the fact that the activation/starting time for the internal combustion engine is often calculated in a complex manner.

SUMMARY

Embodiments are directed to a method for operating a hybrid vehicle that enables good utilization of the battery capacity in a simple manner.

Embodiments are directed to a method for operating a hybrid vehicle that enhances the ride comfort when activating the internal combustion engine.

In accordance with embodiments, a method for operating a hybrid vehicle that comprises an internal combustion engine, an electric machine, an electric storage device and a control system, the method including at least one of the following: determining a first currently available power in the electric storage device by the control system on fulfilment of a first starting condition; activating/starting the internal combustion engine if the determined currently available power from the electric storage device is greater than a first power threshold; and continuously determining the currently available power in the electric storage device by the control system if the determined currently available power from the electric storage device is less than the first power threshold.

In accordance with embodiments, a request to activate/start the internal combustion engine based on the fulfilment of a first activation/starting condition is not done instantaneously after the request. Instead, a determination is subsequently made as to whether the necessary power for activation/starting the internal combustion engine is also available in the electric storage device, taking into account the power currently drawn by electric loads such as the electric machine. Such a determination may occur one or more times until the available power from the electric storage device is greater than the power threshold.

In a method for operating a hybrid vehicle having an internal combustion engine, an electric storage device and a control system includes at least one of: determining a power currently available of the electric storage device by the control system on fulfilment of a first activation condition of the internal combustion engine; activating the internal combustion engine when the determined power currently available from the electric storage device exceeds a first power threshold; and determining the power currently available from the electric storage device by the control system when the determined power currently available from the electric storage device is less than the first power threshold.

In a method for operating a hybrid vehicle having an internal combustion engine and an electric storage device includes at least one of: determining a power currently available of the electric storage device when a current state of charge of the electric storage device is less than a charge threshold value; and activating the internal combustion engine when the determined power currently available from the electric storage device exceeds a first power threshold. In accordance with embodiments, the charge threshold value may be defined as a percentage value of the state of charge (SOC) from the electric storage device.

In a method for operating a hybrid vehicle includes at least one of: determining a power currently available of an electric storage device of the hybrid vehicle when a current state of charge of the electric storage device is less than a charge threshold value; activating an internal combustion engine of the hybrid vehicle when the determined power currently available from the electric storage device exceeds a first power threshold; determining the power currently available from the electric storage device when the determined power currently available from the electric storage device is less than the first power threshold; and determining whether a predetermined maximum time period is exceeded when the determined power currently available from the electric storage device is less than the first power threshold, wherein determining the power currently available from the electric storage device when the determined power currently available from the electric storage device is less than the first power threshold is repeated until either the internal combustion engine is activated or the maximum waiting period is exceeded In a case in which the necessary power is available after the determination, the internal combustion engine is activated/started and the activating/starting request is hereby fulfilled. If, however, the available power resources of the electric storage device are not sufficient, the power consumption of the load is not immediately limited in order to make the power for activation/starting the internal combustion engine available, because the ride comfort would be adversely affected by, for example, a reduction in the current electric drive power. Therefore, an additional determination is made as to whether the required power has not already been fulfilled at a slightly later point in time, because in many driving situations the required electric drive energy is lower at a slightly later time, and hence, an only slightly delayed start of the internal combustion engine is enabled without adversely affecting the fulfilment of the current drive requirements.

In accordance with embodiments, the continuous determination of the power currently available from the electric storage device and checking whether the power currently available from the electric storage device is above the first power threshold is advantageously carried out by a real time control system in a real time loop.

The activation/starting condition is advantageously selected so that there is still sufficient assurance that the vehicle can continue to be operated purely electrically for a sufficiently long period and that the internal combustion engine can then always still be started.

In accordance with embodiments, the first activation/starting condition is fulfilled when the current state of charge of the electric storage device is less than a charge threshold value. The state of charge of the electric storage device is used as the activation/starting condition and the charge threshold value below which activation/starting the internal combustion engine is requested is preferably specified so that at said charge threshold value the electric storage device still has sufficient capacity to enable electric driving for a specified time, for example, a few minutes, and subsequent activation/starting of the internal combustion engine.

In accordance with embodiments, the power currently available from the electric storage device is determined depending on the current load power with which the electric storage device is being loaded by all loads. In this way the present power consumption by all loads, such as, for example, by the electric machine for driving the vehicle, is taken into account in the determination of the available power.

In accordance with embodiments, the power currently available from the electric storage device is advantageously determined as the difference between the maximum power output (state of power) of the electric storage device and the present load power with which the electric storage device is loaded by all loads. The maximum power output of the electric storage device (state of power) is normally determined continuously by battery controllers.

In accordance with embodiments, the first power threshold is determined by multiplying a power required for activation/starting the internal combustion engine and a first spare or safety factor that is in a range between 1.0 and 2.0. When the detection of power needed is very accurate, and also the electric storage device (e.g., battery) may provide a high short-term power, then the first spare value may be close to 1.0. The spare factor, for example, may be approximately 1.2. The power threshold value above which the internal combustion engine is started immediately is thus selected so that the previously determined power that is necessary for activation/starting the internal combustion engine is still multiplied by a specified spare factor, normally greater than one. This advantageously ensures that the available power is sufficient for the entire activation/starting process of the internal combustion engine. In accordance with embodiments, the power threshold value is the activation and starting power of the internal combustion engine, multiplied by the spare factor. The available electric power of the electric storage device must therefore be greater than the power threshold value.

In accordance with embodiments, the sequence whereby a power currently available from the electric storage device is determined and if the power currently available from the electric storage device exceeds a first power threshold the internal combustion engine is started, and if the power currently available from the electric storage device is less than the first power threshold the power currently available from the electric storage device is determined again, is repeated as often as necessary until either the internal combustion engine is started or a maximum waiting period is exceeded.

In accordance with embodiments, a determination may be done continuously as to whether the power required to start the internal combustion engine is also available, and which in the determination is negative, the current loads are still not yet reduced in power but the wait for sufficient power is continued.

In accordance with embodiments, after reaching a specified maximum waiting time period, the waiting cannot be continued because otherwise the capability to start the internal combustion engine is no longer assured. The maximum waiting period can advantageously be a few minutes, for example, approximately 2 minutes, or 5 minutes, or 10 minutes.

In accordance with embodiments, if the maximum waiting period is exceeded, that the current load power with which the electric storage device is loaded by all loads is reduced until the power currently available from the electric storage device exceeds the first power threshold, whereupon the internal combustion engine is started.

The reduction of the load power preferably takes place slowly, for instance, at a maximum of 3 kW per second. This advantageously prevents an abrupt change in the behaviour of the vehicle, especially an abrupt drop in the current drive power.

In accordance with embodiments, the maximum load power is limited with which the electric storage device is loaded by all loads to a second power threshold while the internal combustion engine is being activated/started. After the decision to actually activate/start the internal combustion engine has been taken by the controller of the vehicle and the activation/starting process has been set in progress, this ensures that even during the activation/starting phase of the internal combustion engine the other loads do not consume so much power from the electric storage device that the activation/starting process is placed at risk.

In accordance with embodiments, the second power threshold is determined similarly to the first power threshold, namely by multiplying the power required for activating/starting the internal combustion engine and a second spare factor. The second spare factor may be different value than the first spare factor. The second spare factor may be a value of one, because during the activation/starting phase a lower power reserve is necessary than before activating/starting the internal combustion engine.

In accordance with embodiments, the limitation of the maximum load power is slowly withdrawn after activating/starting the internal combustion engine. In particular, the withdrawal of the limitation may occur in the form of a ramp function, i.e., progressively. Advantageously, in this way, an abrupt power increase of the load, and especially of the electric drive, is prevented.

In accordance with embodiments, when the internal combustion engine is activated/started, it is accelerated to at least 1000 rpm, or at least 1500 rpm. Running up the internal combustion engine to high revolution rates advantageously causes enhanced activation/starting acoustics and enables a reduction of emissions by the internal combustion engine.

DRAWINGS

Embodiments are described by way of example below with reference to the drawings.

DESCRIPTION

Figure 1:
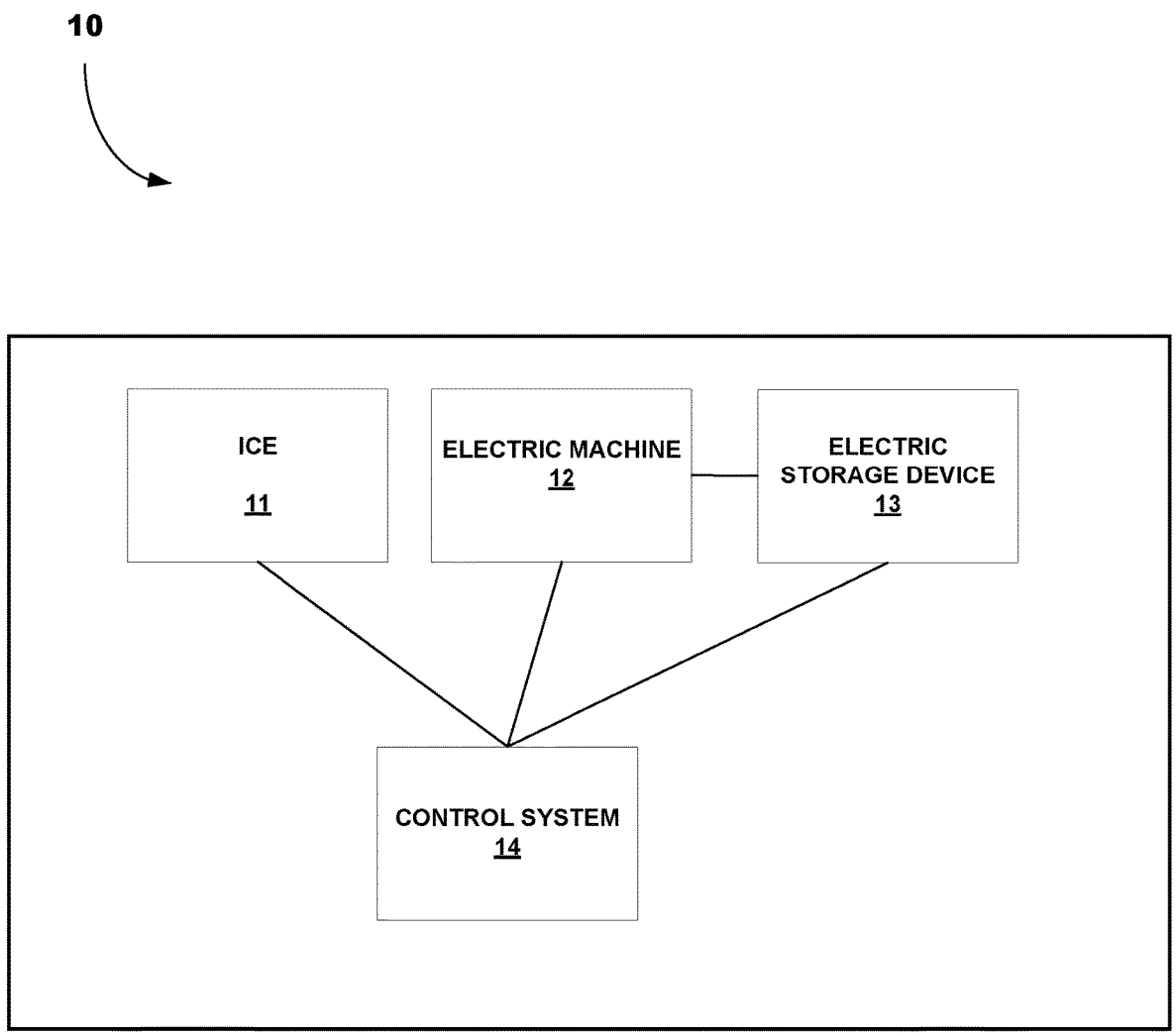
FIG. 1 illustrates a block diagram of an example of a hybrid vehicle and control system for such a hybrid vehicle, in accordance with embodiments.

FIG. 1 illustrates a hybrid vehicle 10 that comprises an internal combustion engine 11, an electric machine 12, an electric storage device 13, and a control system 14 (e.g., a performance-enhanced computing system) operatively connected to at least one of the internal combustion engine 11, the electric machine 12, and the electric storage device 13.

Figure 2:
FIG. 2 illustrates a block diagram of an example of a semiconductor package apparatus implemented in a control system of the hybrid vehicle, in accordance with embodiments.

FIG. 2 illustrates a diagram of a semiconductor package apparatus 20 (e.g., chip) that may be implemented in the control system 14 in accordance with embodiments. The semiconductor package apparatus 20 comprises a substrate 22 (e.g., silicon, sapphire, gallium arsenide) and logic architecture 21 (21a and 21b, e.g., transistor array and other integrated circuit/IC components) operatively coupled to the substrate 22. The logic architecture 21, which may be implemented in configurable logic and/or fixed-functionality logic hardware, includes a host processor 21a and an IO module 21b. The host processor 21a may include, for example, an integrated memory controller (IMC) that communicates with a system memory (e.g., DRAM). The system memory may include instructions which when executed by the host processor 21a, cause the host processor 21a to execute the method 30. Sensor architecture (not illustrated) may be operatively coupled to the host processer 21a via the IO module 21b.

Figure 3:
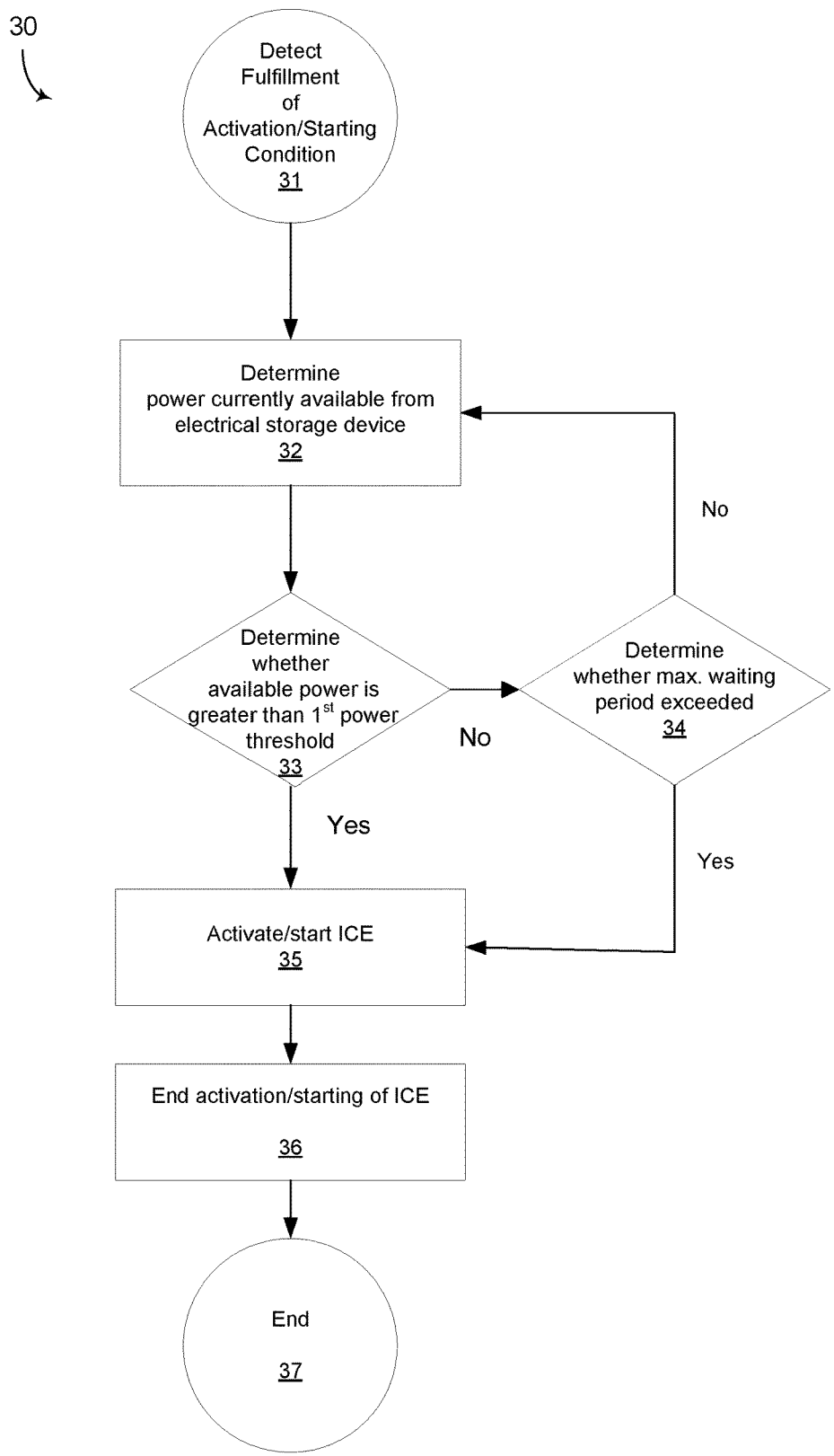
FIG. 3 illustrates a schematic flow diagram of a method for operating a hybrid vehicle, in accordance with embodiments.

The logic 21 may generally implement one or more aspects of the method 30 illustrated in FIG. 3. Thus, the logic 21 may be operatively connected to the sensor architecture including one or more sensors configured to measure or detect at least one of: (i) an activation/starting condition of the hybrid vehicle; and (ii) the power currently available from the electric storage device. The logic architecture 21 may be configured to dynamically control, in response to such determinations/measurements activate and/or deactivate the internal combustion engine 11.

As illustrated in FIG. 3, a method 30 for operating the hybrid vehicle 10 in accordance with embodiments is provided. The method 30 may be implemented by the control system 14 illustrated in FIG. 1 and/or the semiconductor package apparatus 20 illustrated in FIG. 2, and which are respectively described herein.

In processing block 31, the process of the method is set progressively by detecting the fulfilment of a first activation/starting condition by the control system 14, which for example, may be a high level control system, and, if necessary, sending an electric signal to the control system 14 for implementing the method 30 in accordance with embodiments. The fulfilled activation/starting condition can occur in that the current state of charge of the electric storage device 13 of the hybrid vehicle 10 has fallen below or is otherwise a value which is less than a specified or predetermined charge threshold value.

In processing block 32, the control system 14 determines the power currently available from the electric storage device 13 by subtracting the current power consumed by all loads from the current maximum available power of the electric storage device 13, i.e., the current potential power output.

In processing block 33, a determination is then carried out as to whether the power currently available from the electric storage device 13 is greater than a first power threshold, which is essentially defined by the power required for activating/starting the internal combustion engine 11, which can be increased by a spare factor value.

In processing block 34, if the determination reveals that the electric storage device 13 cannot currently provide the required power for activation/starting the internal combustion engine 11, i.e., the power currently available from the electric storage device 13 is less than the first power threshold, then a determination is also conducted as to whether a predetermined maximum waiting period has already been exceeded. Alternatively, of course, the determination may be conducted prior to the determination of processing block 33. Meaning, the determination of processing block 34 is made as to whether the maximum waiting period has already been exceeded, and, only after in a case in which the maximum waiting period has not yet been exceeded, the determination of processing block 33 is made as to whether the currently available power of the electric storage device 13 exceeds the first power threshold, and thus, is thus sufficient for activating/starting the internal combustion engine 11.

If the determination of processing block 33 that the currently available power of the electric storage device is not sufficient and the determination of processing block 34 that the maximum waiting time has not been exceeded, then the process loop returns to another determination of processing block 32 of the currently available power from the electric storage device 13, and then compared with the required power in order to determine whether at a later point in time the currently available power of the electric storage device 13 is sufficient for activating/starting the internal combustion engine 11.

In accordance with embodiments, the determination of processing block 34 of whether the maximum waiting period has already been exceeded may be optionally conducted within the cycle of events of the determination of processing block 32 of the power currently available and the determination of processing block 33 of whether the currently available power exceeds the first power threshold, i.e., even after the determination of processing block 32 of the power currently available from the electric storage device 13 and prior in time to the determination of processing block 33 whether the power currently available is greater than the first power threshold.

In processing block 35, if the determination is conclusive that the available power is sufficient for activating/starting the internal combustion engine 11, i.e., the power currently available from the electric storage device 13 is greater than the first power threshold, the internal combustion engine 11 is thereupon activated/started. When activating/starting the internal combustion engine 11, the maximum power of the remaining loads is limited so that the power necessary for the entire activation/starting process of the internal combustion engine 11 may be reliably provided by the electric storage device 13.

In processing block 36, only at the end of the activation/starting process of the internal combustion engine 11 is the power limiting of the remaining loads slowly withdrawn again.

In processing block 37, the method 30 then concludes.

In accordance with embodiments, the method 30 provides a simple manner in which to operate a hybrid vehicle 10, and enables good utilization of the battery capacity and enhances the ride comfort when activating/starting the internal combustion engine 11 of the hybrid vehicle 10.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating a hybrid vehicle having a control system having one or more processors operatively connected to an internal combustion engine and an electric machine having an electric storage device, the method comprising:
by the control system:
receiving, during a driving sequence of the hybrid vehicle via the electric machine, a request to activate the internal combustion engine;
detecting fulfillment of a first activation condition of the internal combustion engine of the hybrid vehicle, wherein the first activation condition is fulfilled when a current state of charge of the electric storage device is less than a charge threshold value representing a percentage value of a state-of-charge of the electric storage device;
continuously determining, during the driving sequence, a currently available power necessary for activating the internal combustion engine in the electric storage device of the hybrid vehicle;
activating the internal combustion engine only when the determined power currently available from the electric storage device exceeds a first power threshold;
determining, in response to a determination that the power currently available from the electric storage device is less than the first power threshold, whether a predetermined maximum waiting period has been exceeded, and
reducing, in response to a determination that the predetermined maximum waiting period is exceeded, a current load power with which the electric storage device is loaded by all loads until the power currently available from the electric storage device exceeds the first power threshold.

2. The method of claim 1, wherein the first power threshold is determined by multiplying a power required to activate the internal combustion engine and a first spare factor representing a value that is >1.0 and 2.0.

3. The method of claim 1, wherein determining the power currently available from the electric storage device by when the determined power currently available from the electric storage device is less than the first power threshold is repeated until either the internal combustion engine is activated or the predetermined maximum waiting period is exceeded.

4. The method of claim 1, wherein the current load power is reduced by a maximum of 3 kW per second.

5. The method of claim 1, wherein activating the internal combustion engine comprises accelerating the internal combustion engine to at least 1000 rpm.

6. The method of claim 1, wherein activating the internal combustion engine comprises accelerating the internal combustion engine to at least 1500 rpm.

7. The method of claim 1, wherein the predetermined maximum waiting period is approximately 2 minutes, or 5 minutes, or 10 minutes.

8. The method of claim 1, wherein the power currently available from the electric storage device is determined depending on the current load power with which the electric storage device is loaded by all loads.

9. The method of claim 8, wherein the power currently available from the electric storage device is determined as a difference between a maximum power output of the electric storage device and the current load power, with which the electric storage device is loaded by all loads.

10. The method of claim 1, wherein activating the internal combustion engine comprises, during the activation, limiting a maximum load power with which the electric storage device is loaded by all loads to a second power threshold.

11. The method of claim 10, wherein the second power threshold is determined by multiplying the power required to activate the internal combustion engine and a second spare factor.

12. The method of claim 10, wherein a limitation of the maximum load power is withdrawn after activating the internal combustion engine.

13. A method for operating a hybrid vehicle having a control system having one or more processors operatively connected to an internal combustion engine and an electric machine having an electric storage device, the method comprising:
by the control system:
receiving, during a driving sequence of the hybrid vehicle via the electric machine, a request to activate the internal combustion engine;
detecting, in response to the request, fulfillment of a first activation condition of the internal combustion engine of the hybrid vehicle, wherein the first activation condition is fulfilled when a current state of charge of the electric storage device is less than a charge threshold value;
continuously determining, during the driving sequence, a currently available power necessary for activating the internal combustion engine in the electric storage device of the hybrid vehicle by subtracting a current power consumed by all loads from a current maximum available power in the electric storage device;
activating the internal combustion engine of the hybrid vehicle only when the determined power currently available from the electric storage device exceeds a first power threshold;
determining the power currently available from the electric storage device when the determined power currently available from the electric storage device is less than the first power threshold;
determining whether a predetermined maximum time period is exceeded in response to a determination that the power currently available from the electric storage device is less than the first power threshold, and reducing, in response to a determination that the predetermined maximum time period is exceeded, a current load power with which the electric storage device is loaded by all loads until the power currently available from the electric storage device exceeds the first power threshold, wherein determining the power currently available from the electric storage device when the determined power currently available from the electric storage device is less than the first power threshold is repeated until either the internal combustion engine is activated or the predetermined maximum time period is exceeded.

14. The method of claim 13, further comprising repeating the determination of power currently available from the electric storage device, when the determination that the currently available power from the electric storage device is not sufficient and the determination that the predetermined maximum time period is not exceeded, and then compare the repeated determination of power currently available with a required power in order to determine whether, at a later point in time, the power currently available of the electric storage device is sufficient for activating the internal combustion engine.

15. The method of claim 13, wherein the predetermined maximum waiting period is approximately 2 minutes, or 5 minutes, or 10 minutes.

16. A hybrid vehicle, comprising:
an internal combustion engine;
an electric machine;
an electric storage device; and
a control system operatively connected to the electric storage device and the internal combustion engine, the control system including a semiconductor package apparatus having a substrate, and logic coupled to the substrate, wherein the logic is at least partially implemented in one or more of configurable logic or fixed-functionality hardware logic, the logic to:
receive, during a driving sequence of the hybrid vehicle via the electric machine, a request to activate the internal combustion engine;
detect, in response to the request, fulfillment of a first activation condition of the internal combustion engine, wherein the first activation condition is fulfilled when a current state of charge of the electric storage device is less than a charge threshold value representing a percentage value of a state-of-charge of the electric storage device;
continuously determine, during the driving sequence, a currently available power necessary for activating the internal combustion engine in the electric storage device;
activating the internal combustion engine only when the determined power currently available from the electric storage device exceeds a first power threshold;
determine, in response to a determination that the power currently available from the electric storage device is less than the first power threshold, whether a predetermined maximum waiting period has been exceeded, and
reducing, in response to a determination that the predetermined maximum waiting period is exceeded, a current load power with which the electric storage device is loaded by all loads until the power currently available from the electric storage device exceeds the first power threshold.

17. The hybrid vehicle of claim 16, wherein determining the power currently available from the electric storage device when the determined power currently available from the electric storage device is less than the first power threshold is repeated until either the internal combustion engine is activated or the predetermined maximum waiting period is exceeded.

18. The hybrid vehicle of claim 16, wherein the logic is to repeat the determination of power currently available from the electric storage device, when the determination that the currently available power from the electric storage device is not sufficient and the determination that the predetermined maximum waiting period is not exceeded, and then compare the repeated determination of power currently available with a required power in order to determine whether, at a later point in time, the power currently available of the electric storage device is sufficient for activating the internal combustion engine.

19. The hybrid vehicle of claim 16, wherein the predetermined maximum waiting period is approximately 2 minutes, or 5 minutes, or 10 minutes.

* * * * *